Patented Sept. 10, 1946

2,407,565

UNITED STATES PATENT OFFICE 2,407,565

ZINC MERCAPTIDE-AMINOTHIAZOLINE REACTION PRODUCT

Roger A. Mathes, Akron, Ohio, assignor to The B. F. Goodrich Company, New York, N. Y., a corporation of New York No Drawing. Application April 17, 1942, Serial No. 439,386

11 Claims. (Cl. 260—302)

This invention relates to a composition of matter and pertains specifically to reaction products of 2-aminothiazolines with the zinc salt of a heterocyclic nitrogen-containing mercaptan.

My new compounds are particularly useful as accelerators for the vulcanization of rubber, although they may also be used as insecticides, fungicides, etc. Among the rubbers with which my new accelerators may be used are all varieties of natural rubber, such as caoutchouc, balata, gutta percha, latex, reclaimed rubber, artificial rubber isomers, and such synthetic rubbers as can be vulcanized with sulfur, such as copolymers of butadiene, isoprene, 2,3-dimethyl butadiene, piperylene, and the like with acrylonitrile, styrene, methyl acrylate, methyl methacrylate, isobutylene, and other copolymerizable monomers. These new accelerators may be added to the rubber on a roll mill or in an internal mixer or by any other suitable method. The presence of other compounding ingredients, such as any of the ordinary pigments, fillers, dyes, antioxidants, or other accelerators has no deleterious effect upon the accelerating properties of my new materials.

These new products are prepared by reacting, preferably in equimolecular proportions, a 2-aminothiazoline with a zinc mercaptide. By the term 2-aminothiazoline is meant a compound having the formula

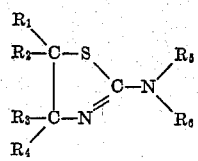

where $R_1$, $R_2$, $R_3$, and $R_4$ may be hydrogen, hydrocarbon, or alkoxy groups, and $R_5$ and $R_6$ may be hydrogen or hydrocarbon groups. Although the hydrocarbon groups, which may be aromatic, aliphatic, or cycloaliphatic, saturated or unsaturated, may contain various substituent groups such as nitro, halo, ether, thioether, etc., they are preferably unsubstituted. The two nuclear carbon atoms may be connected to the ends of a hydrocarbon chain, as for example in the 4,5-cyclotetramethylene thiazolines. Suitable compounds comprise 2-aminothiazoline, 2-amino-4-methylthiazoline, 2-amino-5-methylthiazoline, 2-amino-4,5-dimethylthiazoline, 2-amino-4-ethylthiazoline, 2-amino-5-ethylthiazoline, 2-amino-4,5-diethylthiazoline, 2-amino-4-methoxythiazoline, 2-amino-5-methoxythiazoline, 2-amino-4-ethoxythiazoline, 2-amino-4-phenylthiazoline, 2-amino-5-phenylethiazoline, 2-amino-4-benzylthiazoline, and other similar compounds. Also included are analogous compounds in which one or both of the hydrogens in the amino group have been replaced by such groups as methyl, ethyl, n-propyl, n-butyl, i-butyl, phenyl, p-tolyl, o-tolyl, naphthyl, benzyl, cyclohexyl, and the like. In some cases, both of the amino hydrogens may be replaced with a single group, as in 2-(diphenylguanidyl)-thiazoline. Two aminothiazolinyl groups may be present in a single molecule as in N,N'-thiazolinyl-2,2'-diamino-diethyl sulfide and the like.

The other reactant used to prepare my new compounds comprises the zinc salts of heterocyclic nitrogen-containing mercaptans such as the mercaptothiazoles, including mercaptobenzothiazole, the mercaptothiazolines, the mercapto-oxazoles, the mercapto-oxazolines, the mercaptoimidazoles, the mercapto-imidazolines, the mercaptothiodiazoles, the mercaptothiazines, the mercaptoquinolines, and other similar compounds in which one or more nuclear hydrogen atoms may be replaced with a hydrocarbon or alkoxy group.

The mechanism of the reaction and the structure of the products is not fully understood; however, it appears that the aminothiazoline and the zinc mercaptide react in equimolecular proportions to give a molecular complex.

In order fully to illustrate my invention, the following examples of the preparation of specific compounds are given.

Example I

To a suspension of about 176 parts by weight of the zinc salt of 2-mercapto-4,5-dimethylthiazole in 1350 parts by weight of benzene was added 102 parts of 2-aminothiazoline. The suspension was heated to the boiling point for a few minutes; a homogeneous solution was formed at first, followed by the precipitation of the product. After the mixture was allowed to cool, the benzene was removed by evaporation, leaving 266 parts of a friable, brown, resin-like material.

Example II

To a suspension of about 231 parts by weight of the zinc salt of 2-mercaptobenzothiazole in 1350 parts of benzene was added 102 parts of 2-aminothiazoline. The whole mass immediately formed a homogeneous solution which was allowed to remain at room temperature for several hours. The benzene was then evaporated at reduced pressure, leaving about 321 parts of a soft, sticky resin-like material, light-brown in color.

Example III

To a suspension of about 215 parts by weight of the zinc salt of 2-mercaptothiazoline in 900 parts of benzene was added 82 parts of 2-aminothiazoline. The mixture was heated to the boiling point and allowed to cool for several hours. The product was removed from the reaction mixture by filtration, washed with benzene, and dried. The yield was 285 parts by weight of a granular solid.

Example IV

A suspension of about 106 parts by weight of the zinc salt of 2-mercapto-4,5-dimethylthiazole and about 53.4 parts of 2-anilinothiazoline in 675 parts of benzene was heated to about 70° C. The resulting solution was filtered, and the benzene removed by distillation. About 155 parts of a clear, brittle, resin-like material was secured.

Although 2-aminothiazoline is soluble in water, all of the foregoing products are completely insoluble in water. Similar results can be obtained with other 2-aminothiazolines and zinc mercaptides. The temperature at which the reaction is carried out is not critical, although in general the speed of the reaction is greater at higher temperatures. It is usually desirable to carry out the reaction in the presence of an inert diluent such as benzene, toluene, hexane, gasoline, alcohol, ether, etc.

All of the materials of my invention are extremely active accelerators for the vulcanization of rubber, producing rubber having high tensile strength.

Although I have herein described specific embodiments of my invention, I do not intend to limit myself solely thereto, but to include all the obvious equivalents thereof embraced by the appended claims.

I claim:
1. The reaction product of a 2-aminothiazoline with the zinc salt of a heterocyclic nitrogen-containing mercaptan.
2. The reaction product of a 2-aminothiazoline with the zinc salt of a 2-mercaptothiazole.
3. The reaction product of a 2-aminothiazoline which, except for the nitrogen of the amino group and the nitrogen and sulfur of the thiazoline ring, consists of carbon and hydrogen and is free of aromatic rings, with the zinc salt of a heterocyclic nitrogen-containing mercaptan.
4. The reaction product of a 2-aminothiazoline with the zinc salt of a 2-mercaptothiazoline.
5. The reaction product of a 2-aminothiazoline with the zinc salt of 2-mercapto-4,5-dimethylthiazole.
6. The reaction product of a 2-aminothiazoline which, except for the nitrogen of the amino group and the nitrogen and sulfur of the thiazoline ring consists of carbon and hydrogen and is free of aromatic rings, with the zinc salt of a 2-mercaptothiazole.
7. The reaction product of a 2-aminothiazoline which, except for the nitrogen of the amino group and the nitrogen and sulfur of the thiazoline ring, consists of carbon and hydrogen and is free of aromatic groups, with the zinc salt of a 2-mercaptothiazoline.
8. The reaction product of a 2-aminothiazoline with the zinc salt of 2-mercaptothiazoline.
9. The reaction product of 2-anilinothiazoline with the zinc salt of 2-mercapto-4,5-dimethylthiazole.
10. The reaction product of 2-aminothiazoline with the zinc salt of 2-mercaptobenzothiazole.
11. The reaction product of 2-aminothiazoline with the zinc salt of 2-mercaptothiazoline.

ROGER A. MATHES.